_United States Patent Office_ 2,939,800
Patented June 7, 1960

2,939,800

PRODUCTION OF COLD MIXED ASPHALTIC PAVING COMPOSITIONS

Wilbur E. Fox, Flossmoor, Ill., and Walter A. Los, East Chicago, Ind., assignors to Sinclair Refining Company, New York, N.Y., a corporation of Maine No Drawing. Filed Dec. 4, 1956, Ser. No. 626,085

4 Claims. (Cl. 106—280)

This invention relates to cold-mixed asphaltic compositions suitable for surfacing roads and other surfaces. More particularly, our invention relates to paving compositions of the asphaltic type which are readily workable and adaptable to storage or stockpiling over extended periods of time without becoming agglomerated into hard, unworkable masses.

It is well known that cold-mixed paving compositions may be prepared from gravel and asphalt. Generally, these compositions are obtained by methods similar to that of the Baskin Patent No. 2,062,348 wherein the mineral aggregate is first coated with a layer of flux oil and thereafter mixed with powdered asphalt in such a manner that the asphalt adheres to the oiled aggregate. When the composition is first prepared by these methods, the mix is loose and free flowing. However, after the composition has been stored in loose stockpiles for an extended period of time, the asphalt gradually softens under the influence of the flux oil to cement the particles of aggregate into a hard, unworkable mass. Various other methods for manufacturing similar paving compositions have been proposed, e.g. see the Wait and Haller Patent No. 2,049,985.

In the present invention, we provide asphaltic paving compositions which may be cold-mixed and stockpiled for considerable periods of time without undergoing undue agglomeration. In accordance with our invention, the improved asphaltic paving compositions can be obtained by coating mineral aggregate with a suitable flux oil and thereafter mixing macrosized particles, at least the surfaces of which are asphalt, with the flux oil-coated aggregate so that the asphalt-covered particles become dispersed throughout the composition. The asphalt-covered particles can be hard asphalt crushed to macrosize as well as macrosized particles having a core of a dissimilar material.

In one embodiment, our method includes the steps of heating asphalt and mineral aggregate to a substantial degree, that is, at least to the softening point of the asphalt, and agitating the mixture until the aggregate has become coated with the asphalt. The coated particles are of macrosize. In the coating operation, temperatures of at least about 250° F. are generally employed while temperatures of about 350 to 600° F. are preferred. Higher temperatures are usually avoided as they can deleteriously affect the asphalt when it is heated in air. Another portion of aggregate is mixed with flux oil to coat the aggregate with the oil and thereafter the two differently coated mineral aggregates are intimately commingled in order to form the final asphaltic composition. This commingling is usually at ambient temperatures. However, higher or lower temperatures can be used if desired, the only limitation being the avoidance of temperatures which would soften the asphalt sufficiently to cause undue agglomeration in the presence of the flux oil. Thus the mixing temperature will be below the softening point of the asphalt. In a second embodiment, we produce essentially the same result by intimately commingling the flux oil-coated aggregate with macrosized particles of asphalt. As in the previous embodiment, this commingling is at ambient temperature or at least a temperature which will not unduly soften the asphalt. In either embodiment, uncoated aggregate could be present so long as there is sufficient oil and asphalt to provide effective binding of the total aggregate of our compositions.

Our method is devised to avoid undue agglomeration through the absence of any substantial amount of powdered asphalt in the cold mixture containing aggregate, flux oil and asphalt. Powdered asphalt can, of course, be employed to coat the aggregate in the embodiment of the method utilizing the asphalt-coated aggregate and in this procedure, the aggregate particles need not be completely coated. Also, as can be seen, the flux oil is included by addition of the oil-coated aggregate as substantial amounts of the free flux oil can lead to agglomeration of the composition.

The asphalt-covered particles of this invention are of macrosize, that is, they fall predominantly in the size range of about ⅛ to 1 inch, preferably about ⅛ to ½ inch, in diameter and will have very little material, if any substantial amount, of less than about ¹⁄₃₂ of an inch in this respect. When these particles are solid asphalt, we prefer that their diameters be about ⅛ to ¼ of an inch and when we employ asphalt-coated aggregate, the diameter of the particles are advantageously in the range of about ⅛ to ½ inch. We could, of course, employ both of these types of asphalt-surfaced macrosize particles in a given composition.

It is to be understood that our invention is not limited to any specific type of asphalt, flux oil or aggregate and the ratios of these materials used in our method can be varied and in general, the use to which the compositions are put will govern these characteristics. In the examples given below, we have described an asphaltic composition wherein the binder (flux oil plus asphalt) is composed of 60 percent by weight of hard asphalt, the binder having a needle penetration of 73 at 77° F. We have found that the needle penetration of the binder may vary as much as about 40 to 300 at 77° F. and still produce a satisfactory product. Since the needle penetration of the binder is determined by the asphalt-flux oil ratio it follows that the asphalt may range from about 45 to 70 percent by weight of the binder and still produce a binder having a needle penetration falling within the satisfactory range set forth above. The ratio of the binder to the aggregate can be varied in accordance with the desired product, and we have found that the best results can be obtained by limiting the binder to about 5 to 25, preferably about 5 to 10, percent by weight of the final composition.

The asphalts to be used in compositions prepared in accordance with our invention can have wide variations in properties, the main requirement of the asphalt being that it must be brittle at room temperature. Asphalts which are suitable for use in our invention can have these approximately characteristics:

Softening point (R. & B.) ° F. _____ 200 min.
Needle penetration at 77° F., 100 g., 5 sec. ___ 12 max.

The flux oil used in our invention is also capable of wide variations in properties and is frequently an aromatic extract of a distilled lubricating oil. In general, the flux oil should possess the following properties:

(1) Low viscosity, since the lower viscosity oil will spread more quickly and uniformly over the surface of the aggregate.

(2) Low volatility in order to prevent the ratio of flux oil to asphalt from changing due to the evaporation of the flux oil during storage.

Flux oils which are suitable for use in our process can have these approximate characteristics:

| | |
|---|---|
| Gravity, °API | 20 max. |
| Viscosity at 210° F., SSU | 35–100 |
| Flash, °F. | 300 min. |

The mineral aggregate employed in our invention can range in size from fines to stone chips up to about 1 inch in diameter. Generally the mineral aggregate will compose about 75 to 95, preferably about 90 to 95, percent by weight of the total asphaltic composition. Preferably the aggregate contains both fines and chips, the fines (up to about 1/8 inch in diameter) serving as an inorganic void-filling material comprising about 25 to 85, preferably about 30 to 80, percent by weight of the total mineral aggregate and the stone chips ranging in size from about 1/8 inch to 1 inch in diameter comprising about 15 to 75, preferably about 20 to 70, percent by weight of the total mineral aggregate. It should be appreciated that when coating aggregate with asphalt, the size of the aggregate is selected to provide asphalt-covered particles of macrosize.

The following specific examples are presented to illustrate our method of producing a cold-mixed paving composition having improved stockpiling characteristics.

Materials in the composition:

| | Percent by wt. |
|---|---|
| 3/8" chips (crushed limestone) | 23.00 |
| Stone sand (crusher screenings) | 41.00 |
| Bank sand | 21.50 |
| Mineral filler (powdered limestone) | 6.75 |
| Asphalt | 4.65 |
| Flux oil | 3.10 |

The asphalt has the following properties:

| | |
|---|---|
| Specific gravity, 77° F./77° F. | 1.0407 |
| Softening point (R. & B.), °F. | 293 |
| Needle penetration at 77° F., 100 g., 5 sec. | 1 |
| Needle penetration at 115° F., 50 g., 5 sec. | 2 |

The flux oil is an aromatic extract of a distilled petroleum lubricating oil which tested:

| | |
|---|---|
| Gravity, °API | 8.0 |
| Flash, °F. | 385 |
| Viscosity at 210° F., SSU | 53.5 |
| Pour, °F. | 45 |
| Aniline point, °C. | below −6 |

According to the first embodiment of our method, the 23 parts of 3/8" stone chips are heated to 350° F. Hard asphalt ground to a fine powder is added to the hot chips and mixed to coat the chips with molten asphalt. The mixture thereafter is cooled and the fused mass crushed to yield individual chips coated with asphalt. The remaining portion of the aggregate, i.e. the fines, consisting of 41.00 parts stone sand, 21.50 parts bank sand and 6.75 parts of mineral filler is coated with 3.10 parts of flux oil by mixing the aggregate and flux oil at ambient temperature. When the aggregate has become coated with the flux oil, the asphalt-coated chips are added and the mixing continued until the asphalt-coated chips are distributed throughout the composition.

The second embodiment of our method of producing the cold-mix composition comprises coating the total aggregate consisting of 23.00 parts of 3/8" stone chips, 41.00 parts stone sand, 21.50 parts bank sand and 6.75 parts mineral filler with 3.10 parts of flux oil by mixing them at ambient temperature until the oil has coated all of the aggregate. To the oil-coated aggregate is added 4.65 parts of hard asphalt crushed to particle sizes of 1/8" to 1/4" in diameter and mixing is continued until the asphalt particles become dispersed throughout the composition.

A series of tests were performed on the asphaltic compositions prepared in accordance with the examples given above and the following results were obtained.

Examination of the cold-mix composition from each of the above processes immediately after the final mixing revealed a uniform distribution of the asphalt-covered particles throughout the composition. However, after 72 hours, it was found that very few asphalt-covered particles were visible and that the aggregate surrounding the asphalt-covered particles had adhered to them, forming small lumps 3/4" to 1" in diameter. The compositions were allowed to settle for an additional three weeks. Examination after this period revealed that no further agglomeration had occurred, indicating that the initial adhesion of the aggregate around the asphalt-covered particles formed a barrier, effectively preventing further agglomeration.

A simultated stockpiling test was devised in order to measure the storage characteristics of our improved asphaltic compositions in comparison with similar compositions prepared by the usual commercial process. A two-inch layer of cold-mix prepared by each of our above methods was placed in separate 6" x 6" molds and a pressure of 1000 lbs./sq. ft. was applied to the surface of the composition for a period of seven days at a temperature of 70 to 80° F. A similar mold was filled with a layer of a composition prepared by the usual commercial methods and the same pressure and temperature applied. At the end of the seven-day period the three samples were removed from the molds and examined. It was found that the paving compositions made in accordance with our method were loose, friable and easily crumbled while the commercial composition was hard, dense and to all appearances completely agglomerated.

The cold-mix compositions prepared by our process were heated and mixed at 250° F. Examination of the mixes indicated that the binder was completely dispersed over the aggregate and that the mixes were ready for application without further treatment.

It can be seen, therefore, from the foregoing that we have provided a method whereby agglomeration in the cold-mix asphaltic compositions is avoided. Furthermore, as indicated by the above tests, our method in no manner impairs the efficiency of the fluxing agent to disperse the asphalt throughout the final composition since the dispersion is easily affected by heating the composition in simple equipment and at relatively low temperatures, e.g. above about 250° F., preferably about 300 to 500° F., just prior to the time of application.

We claim:

1. In a process for producing a cold-mixed asphaltic paving composition having superior stockpiling characteristics the steps comprising coating aggregate with flux oil and mixing the flux oil-coated aggregate with particles of about 1/8 to 1 inch in diameter selected from the group consisting of asphalt and aggregate covered with asphalt until the particles are dispersed throughout the composition, the amount of asphalt in the particles being about 45 to 70 weight percent based on the flux oil and asphalt and about 15 to 75 percent of the total aggregate being about 1/8 to 1 inch in diameter.

2. The process of claim 1 in which the particles are about 1/8 to 1/2 inch in diameter.

3. The process of claim 1 wherein the particles are asphalt particles of about 1/8 to 1/4 inch in diameter.

4. The process of claim 1 wherein the particles are aggregate covered with asphalt and are about 1/8 to 1/2 inch in diameter.

References Cited in the file of this patent

UNITED STATES PATENTS

| | | |
|---|---|---|
| 1,778,461 | Nicholson | Oct. 14, 1930 |
| 1,929,388 | Mullen | Oct. 3, 1933 |
| 1,975,548 | Hirzel | Oct. 2, 1934 |
| 1,991,319 | Finley | Feb. 12, 1935 |
| 2,051,577 | Schloss | Aug. 18, 1936 |